United States Patent
Alanazi et al.

(10) Patent No.: US 11,275,016 B2
(45) Date of Patent: Mar. 15, 2022

(54) SYSTEM AND METHOD FOR TESTING REPASSIVATION KINETICS

(71) Applicant: Saudi Arabian Oil Company, Dhahran (SA)

(72) Inventors: Nayef M. Alanazi, Dhahran (SA); Muthukumar Nagu, Dhahran (SA); AbdulHadi Abdullatif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 276 days.

(21) Appl. No.: 15/900,400

(22) Filed: Feb. 20, 2018

(65) Prior Publication Data

US 2019/0257739 A1   Aug. 22, 2019

(51) Int. Cl.
  *G01N 17/02* (2006.01)
  *G01N 27/416* (2006.01)
  *G01N 17/00* (2006.01)

(52) U.S. Cl.
  CPC .......... *G01N 17/02* (2013.01); *G01N 17/006* (2013.01); *G01N 27/416* (2013.01)

(58) Field of Classification Search
  CPC ................ G01N 27/416; G01N 17/00–046
  See application file for complete search history.

(56) References Cited

U.S. PATENT DOCUMENTS

| | | | |
|---|---|---|---|
| 2,809,437 A * | 10/1957 | Kuzma | B25H 7/045 33/27.02 |
| 6,365,034 B1 | 4/2002 | Spellane | |

FOREIGN PATENT DOCUMENTS

| | | | |
|---|---|---|---|
| CN | 202177558 U | * | 3/2012 |
| CN | 202177558 U | | 3/2012 |
| CN | 102944602 B | | 7/2014 |
| CN | 104849203 A | * | 8/2015 |
| CN | 104849203 A | | 8/2015 |

OTHER PUBLICATIONS

R.W. Bosch et al., Development of a scratch test in an autoclave for the measurement of repassivation kinetics of stainless steel in high temperature high pressure water, Electrochimica Acta, vol. 49, pp. 3029-3038 (2004) (Year: 2004).*

(Continued)

*Primary Examiner* — Maris R Kessel
(74) *Attorney, Agent, or Firm* — Leason Ellis LLP

(57) ABSTRACT

An electrochemical system for measuring the repassivation kinetics of a metallic material under sour oil field conditions comprises a housing made of the metallic material surrounding an internal space; insulating covers positioned on the housing, an electrolyte enclosed within the internal space of the housing and the insulating covers, a scratch tool including a second housing made of an insulting material that one end positioned in the electrolyte, a sample holder for holding a sample composed of the metallic material, and a pin tip positioned to scratch off a passivation film from the sample surface, and an electrical power source coupled to the housing and the sample within the scratch tool so as to generate an electric current between the housing and the sample, wherein the sample holder is movable with respect to the pin tip to create a scratch on the sample within the electrolyte.

6 Claims, 4 Drawing Sheets

(56) References Cited

OTHER PUBLICATIONS

T. A. Adler, et al., Wear and scratch hardness of 304 stainless steel investigated with a single scratch test, Wear, vols. 162-164, pp. 713-720 (1993) (Year: 1993).*
Goodman et al. "Repassivation behavior of X65 Pipeline Steel in Fuel Grade Ethanol and its Implications for the Stress Corrosion Cracking Mechanism" Corros. Sci. 65 (2012) 238-248.
Wang et al "Development of a Scratch Electrode System in High Temperature High Pressure Water" Corros. Sci. 95 (2015) 125-132.
I. Toor "Repassivation Kinetics and its Role in SCC Prediction—A Review" Int. J. Electrochem. Sci. International Journal, Mar. 23, 2014.
J Kruger et al. : "The Role of Passive Film Growth Kinetics and Properties in Stress Corrosion and Crevice Corrosion Susceptibility." Jul. 1, 1973, retrieved from the internet.
Marshall P I et al: Effects of a alloyed molybdenum on the kinetics of repassivation on austenitic stainless steeels, Corrosion Science, Oxford, GB, vol. 24, No. 5, Jan. 1, 1984.
International Search Report and Written Opinion in corresponding PCT Application No. PCTUS2019/018694, dated Jun. 14, 2019. 12 pages.
R.W. Bosch, B. Schepers, M. Vankeerberghen, Development of a scratch test in an autoclave for the measurement of repassivation kinetics of stainless steel in high temperature high pressure water, Electrochim. Acta. 49 (2004) 3029-3038.
Examination Report in Corresponding Gulf Coast Application No. 2019-37034 dated Jun. 29, 2020. 4 pages.

\* cited by examiner

SYSTEM AND METHOD FOR TESTING REPASSIVATION KINETICS

FIELD OF THE INVENTION

The present invention relates to monitoring of corrosion in oil and gas infrastructure, and in particular, relates to a system and method for testing repassivation kinetics of scratched surfaces in sour environments.

BACKGROUND OF THE INVENTION

The oil and gas industry employs a vast steel pipe infrastructure for crude, fuel, and gas transportation. Steel is known to react and oxidize readily when exposed to water, oxygen, and/or acid gases resulting in the production of a "passive" oxidized film on the surfaces of steel structures. The passive film effectively isolates the underlying reactive metal and provides corrosion resistance. However, over time such passive films can accumulate damage due to mechanical and chemical wearing, exposing areas of the underlying metal. When such damage occurs it is important for "repassivation", the formation of a new passive film at the damaged and exposed surface areas, to take place rapidly to avoid further damage to the pipe and/or potential crack formation.

To date, while studies of repassivation kinetics of steels have been reported, such studies do not mimic the sour field conditions prevalent in oil and gas pipelines (i.e., conditions in which there is a significant amount of hydrogen sulfide ($H_2S$), and area ratio of the damaged film and the steel structure), and do not simulate conditions to properly test repassivation kinetics in this context. What is therefore needed is a method and apparatus that simulates corrosion damage as it occurs in the field, allowing repassivation kinetics to be studied under these conditions and in the presence of corrosion inhibitors.

SUMMARY OF THE INVENTION

Embodiments of the present invention provide an electrochemical system for measuring the repassivation kinetics and corrosion inhibitor film persistency of a metallic material under simulated sour oil field conditions. The electrochemical system comprises: a) a housing made of the metallic material surrounding an internal space; insulating covers positioned on the housing; b) an electrolyte enclosed within the internal space of the housing and the insulating covers; c) a scratch tool including i) a second housing made of an insulting material that has a first end positioned on an external side of the insulating cover and a second end positioned in the electrolyte, ii) a sample holder for holding a sample composed of the metallic material, and iii) a pin tip positioned with respect to the sample to scratch off a passivation film from the sample surface; and d) an electrical power source coupled to the housing and the sample within the scratch tool so as to generate an electric current between the housing and the sample, wherein the sample holder is movable with respect to the pin tip to create a scratch on the sample within the electrolyte.

In certain embodiments, at least one of the insulating covers includes a gas inlet port and a gas outlet port, the gas inlet port providing an inlet for purge gas to be bubbled through the electrolyte to simulate the sour filed conditions. The electrochemical can also include a reference electrode positioned within the electrolyte and, in certain implementations, a counter electrode positioned within the electrolyte.

In certain embodiments, the scratch tool further includes a moveable shaft coupled to the sample holder, the sample holder being moveable via the shaft so as to bring a surface of the sample into contact with the pin tip. In some implementations, the shaft is manually movable via the part of the scratch tool on the external side of the insulating cover.

Embodiments of the present invention also provide a scratch tool apparatus. The scratch tool apparatus is adapted for an electrochemical system for measuring the repassivation kinetics and corrosion inhibitor film persistency of a metallic material under simulated sour oil field conditions. The scratch tool comprises a rectangular housing having first and second longitudinal ends made of an insulating material having an opening positioned along toward the second longitudinal end, a sample holder positioned within the opening the rectangular housing adapted to holder a sample composed of the metallic material while the sample is exposed to a surrounding environment, a shaft coupled running from the first to the longitudinal end of the housing to the sample holder manually operable to move the sample holder longitudinally, and a pin tip positioned proximal to a surface of the sample. The shaft can be moved to cause motion of the sample relative to the pin tip to create a scratch on a the surface of the sample, and the scratch tool can be coupled to an electrochemical cell in such manner that the sample can be scratched while the sample is immersed in an electrolyte with a sour field conditions.

In certain embodiments, the scratch tool apparatus includes conductive wire coupled at a first end to the sample, wherein the second end of the conductive wire can be coupled to an electrical power source to enable the sample to act as the anode of an electrochemical cell.

In addition, the embodiments of the present invention provide a method of measuring the repassivation kinetics and corrosion inhibitor film persistency of a metallic material under simulated sour oil field conditions. The method comprises a) forming an enclosure having walls made of the metallic material and insulating covering surrounding an interior region; b) adding an electrolyte having sour conditions to the interior region of the enclosure; c) immersing a sample made of the metallic material within the electrolyte for a sufficient duration to form a passivation film on the sample; d) scratching the sample to remove part of the passivation film from the sample; e) coupling the walls of the enclosure and the scratched sample to an electrical power source, forming an electrical circuit with the walls of the enclosure acting as a cathode, and the scratched sample acting as an anode; and f) measuring a current in the electrical circuit formed by the walls of the enclosure and the scratched sample, wherein the current measured is indicative of the repassivation kinetics and corrosion film persistency of the metallic material.

In certain embodiments the method further comprises supplying a purge gas to the electrolyte to generate the sour conditions.

In some implementations, the sample is scratched using a scratch tool that is inserted through the coverings of the enclosure into the electrolyte, and the scratch tool including an activation mechanism located external to the enclosure. Reference and counter electrodes can be added within the enclosure and coupled to the electrical power source.

These and other features can be appreciated from the accompanying description of certain embodiments of the invention which are discussed in relation to the accompanying drawing figures.

DETAILED DESCRIPTION CERTAIN OF EMBODIMENTS OF THE INVENTION

The embodiments disclosed herein include an electrochemical cell system and method for measuring the repassivation kinetics and corrosion inhibitor film persistency under simulated sour oil field conditions. The simulation is enhanced by using an annular section of a pipe normally used in the field (e.g., steel) as the cathode, and a scratched sample of the same metallic material as the anode of an electrochemical cell filled with electrolyte (e.g., brine with $H_2S$ purge gas). Initially, the cathode and non-scratched sample are exposed to sour conditions and develop a passive film through oxidation. The sample is then scratched to expose the underlying metal, simulating a damaged film. When a potential difference is generated across the pipe cathode and scratched sample, the current flow measured between the cathode and anode is a function of the repassivation kinetics of the material and/or corrosion inhibitor film forming capability at the scratched anode. The similar metallurgy of the cathode and anode removes an additional variable and enable quantification of a potential difference between a large passivated surface (cathode pipe surface) and a small damaged material (anode) which is a significant driving force of localized corrosion, Through this method, these repassivation, inhibitor film formation in field conditions can be properly simulated and studied.

Figure 1:
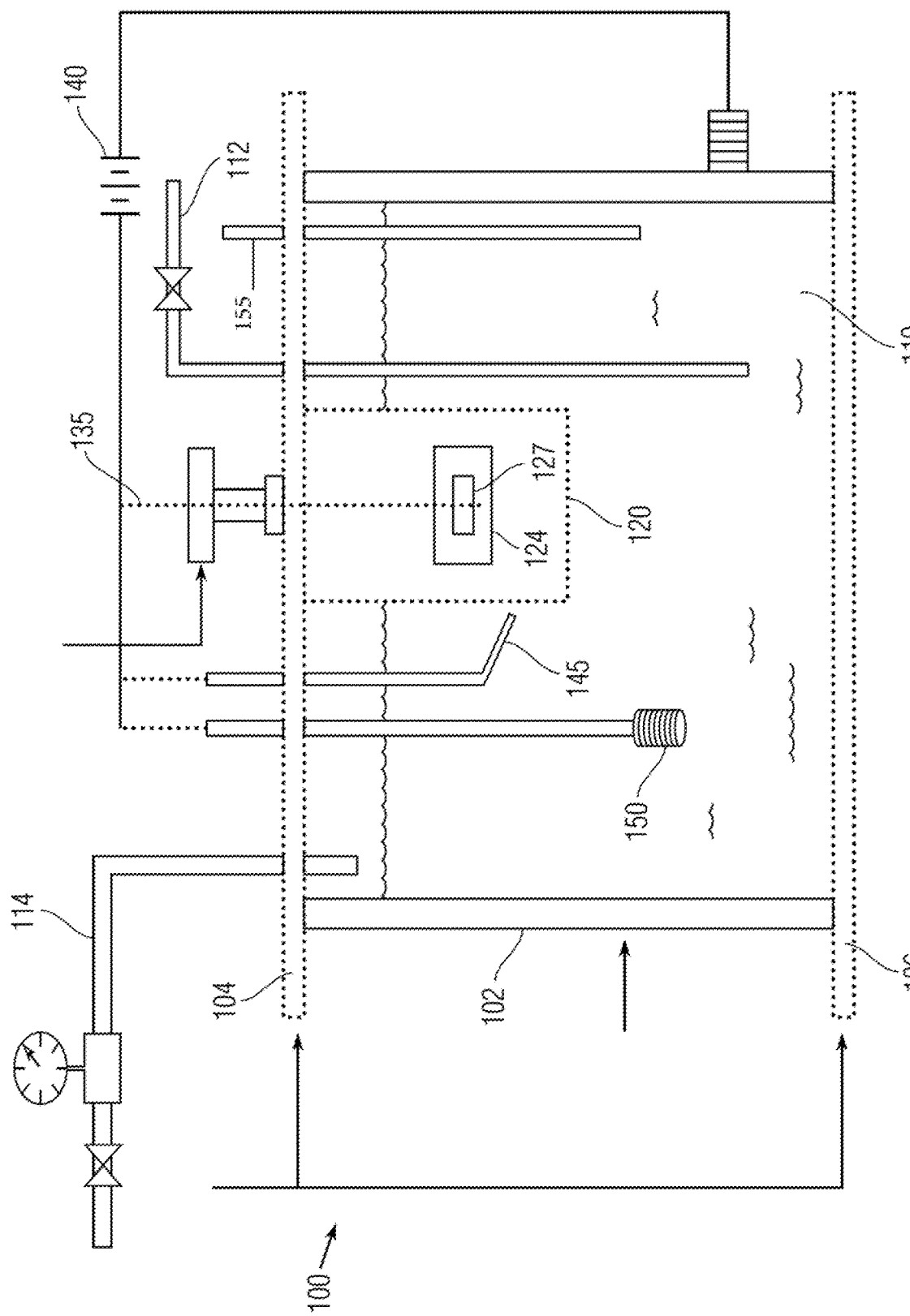
FIG. 1 is a cross-sectional view of a system for measuring repassivation kinetics in sour field conditions according to an exemplary embodiment of the present invention.

FIG. 1 depicts an embodiment of a system for measuring repassivation kinetics in sour field conditions according to an exemplary embodiment of the present invention. The system 100 comprises an enclosure formed from a annular section 102 composed of a metallic material, e.g., steel, which forms side wall of the enclosure, a top covering 104 tightly coupled to the top of pipe section 102, and a bottom covering 106 tightly covered to the bottom of annular section 102. In alternative embodiments, the enclosure can also be formed from sections of other shapes and cross-sections, such as square and rectangular. The top and bottom coverings 104, 106 are preferably made of a non-metallic, electrically insulating material. The annular wall section 102 can be a section cut from a pipe used in the industry and can be made of different materials and alloys such as, but not limited to, carbon steel, austenitic, or duplex stainless steels, or Nickel based alloys. The top and bottom coverings 104, 106 can be coupled to the annular wall 102 using O-rings (not shown) to prevent any leakage out of the enclosure.

The enclosure is adapted to house an electrochemical cell. In particular the internal space within the enclosure can be substantially filled (i.e., at least 50% of the volume) with an electrolyte 110, such as brine. The electrolyte can be adapted to simulate sour field conditions, in terms of pH, temperature, pressure, gas composition and concentration, by applying a purge gas with a controlled amount of hydrogen sulfide and carbon dioxide via a gas inlet 112 that extends through an opening the top covering 104 and into the electrolyte 110. A corresponding gas outlet 114 is also provided through the top covering 104 through which gas bubbling out of the electrolyte can exit from the enclosure. A scratch tool 120 also extends through the top covering 104 into the electrolyte 110. The purpose of the scratch tool 120 is to create a scratched metallic sample in vivo that can be tested for repassivation kinetics. A thermocouple 155 is positioned with one end situated to sense the temperature in the electrolyte 100. Leads from the thermocouple provide signals indicative of the temperature of the electrolyte. The signals can be used in an open or closed loop control system to maintain the temperature of the electrolyte within a selected range.

Figure 2:
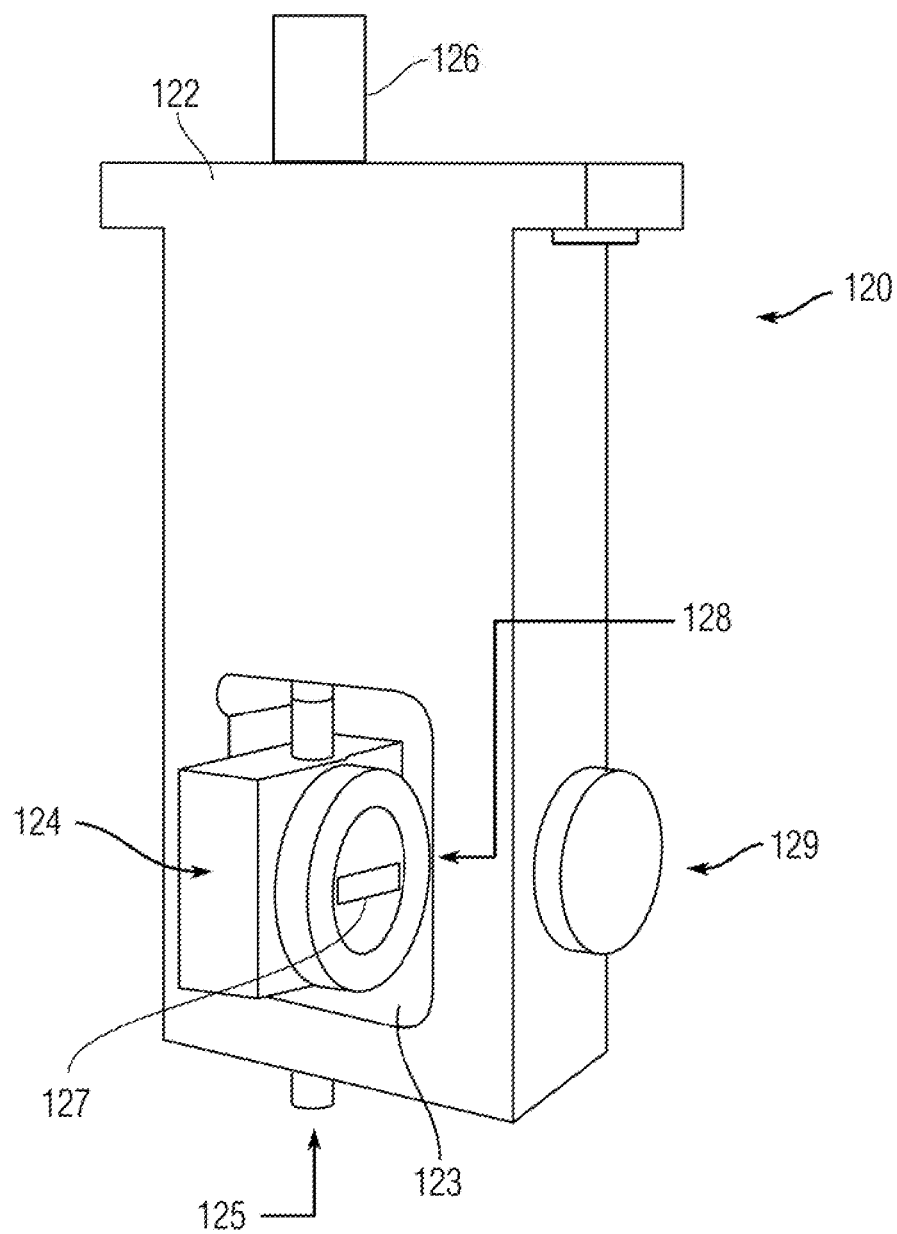
FIG. 2 is a perspective view of an embodiment of a scratch apparatus that can be employed in systems for measuring repassivation kinetics in sour field conditions according the present invention.

The scratch tool 120 is shown in greater detail in the perspective view of FIG. 2. As shown, the scratch tool includes a generally rectangular housing 122 elongated vertically along a longitudinal dimension. At the top, or first longitudinal end of the housing 122, two protruding flange features extend from the housing transversely to the longitudinal dimension forming a seating surface for the scratch tool 120 on the top covering 104. The housing 122 includes a hollow-out section 123 near the bottom (second longitudinal end) of the housing 122. A sample holder 124 is sized to fit within hollow section 123. The housing 122 and sample holder 124 can be made of a material having high resistance to a wide variety of chemical environments and/or elevated temperatures such as polyether ether ketone (PEEK). The sample holder 124 is rigidly coupled to a shaft 125 that is moveable vertically, and the sample holder is thus moveable in the vertical direction as well. A manual control 126 for adjusting the vertical position of the shaft is positioned at the top of the housing. The sample 127 positioned on the sample holder can be a metallic disk or coupon. It is preferable for the sample 127 to be of the same material as the annular section 102 of the enclosure 101. For example, the sample can also be composed of metals such as, but not limited to, carbon steel, austenitic, or duplex stainless steels, or Nickel based alloy. A surface of the sample 127 is at least partially exposed to the electrolyte. A pin 128 with a sharp tip is positioned so that the tip is positioned close to but not in contact with the surface of the sample. The pin 128 can be made of, but is not limited to, high speed steel (HSS) which composed of 18% tungsten, 4% chromium, 1% vanadium, 0.7% carbon and the remainder of iron. The precise positioning and pressure exerted by the pin 128 on the sample surface is pre-adjustable via an adjustment knob 129.

Figure 4:
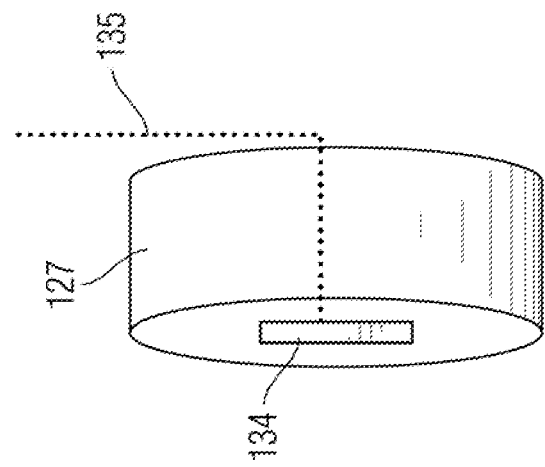
FIG. 4 is a cross-sectional view of a scratched sample according to an exemplary embodiment of the present invention.
Figure 3:
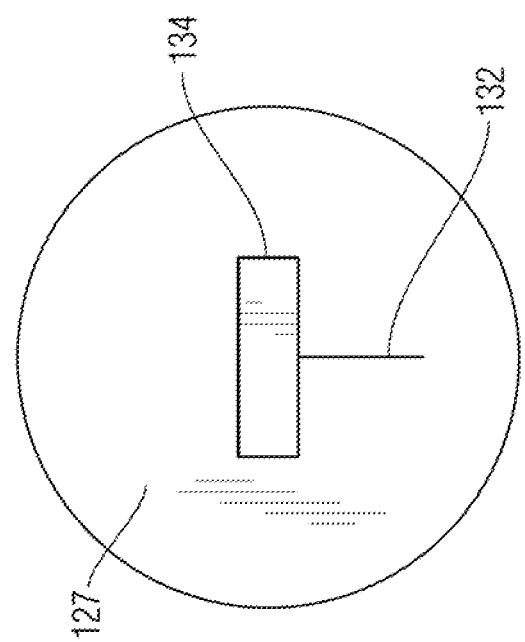
FIG. 3 is a side, perspective view of an embodiment of a scratch sample according to an exemplary the present invention.

In operation, after a repassivation film layer has formed on the sample, when the shaft is raised or lowered, the sample holder is moved vertically (longitudinally), carrying the surface of the sample 127 along and past the tip of the pin 128. The contact with the tip of the pin creates a scratch through the film on the surface of the sample. FIG. 3 is an exemplary photograph of a sample 127 bearing a scratch 132 produced by the scratch tool according to the present invention. A piece of conductive tape 134 is attached to the scratch 132. As shown schematically in FIG. 4, which is a schematic perspective view of the sample 127, one end of an electrical wire 135 is coupled via, e.g., the electrical tape to the scratched surface of the sample. The other end of the electrical wire couples to the electrical power source of the electrochemical cell as described below.

Referring again to FIG. 1, the scratch tool 120 is positioned such that the top of the tool is above the top covering 104 and outside of the enclosure 101, while the bottom portion of the scratch tool is positioned beneath the top covering, with the sample holder 124 immersed in the electrolyte 110. To create an electrochemical cell, an electrical power source (e.g., potentiostat) 140, is coupled to the electrodes of the cell. The annular section 102 is coupled to a first, ground terminal of the electrical power source and acts as the cathode of the cell. A second terminal of the electrical source is electrically coupled to a reference electrode 145 that extends into the electrolyte 110 proximal to the scratch tool. The second terminal is also electrically coupled to the sample 127 via the electrical wire 135. In this configuration the sample acts as the anode of the electrochemical cell. The second terminal can optionally be coupled to a counter electrode 150 positioned distally from the scratch tool. Through this configuration, the galvanic current flow between the sample 127, which has a small surface area, and the annular wall 102, which has a comparatively larger surface area, can be measured.

In operation, after fixing the scratch tool 120 to enclosure 101, the electrolyte 110 can be transferred to the cell together with the amount of purge gas flow (e.g., $H_2S$ and $CO_2$) suited for establishing a sour environment. The adjustment knob 129 should be adjusted to ensure that the tip of the pin 128 is positioned just above but not touching the exposed surface of the sample. Before applying the scratch, the exposed surface of the sample is immersed in the electrolyte so that a passive corrosion film forms on the exposed surface. At the same time a corrosion product forms on the internal surface of the annular section 102. The corrosion potential can be monitored using the open circuit potential (OCP) to ensure a steady state and film formation. Once a steady state potential has been attained, a repassivation layer forms on the sample surface, increasing the effective thickness of the sample. The increase in thickness brings the tip of the pin into contact with the repassivation film. When the sample is raised or lowered in a vertical direction by pulling shaft 125 upward (via manual control 126), the movement of the sample vis a vis the stationary pin scratches the repassivation film on the sample and exposes the metal along the seam of the scratch.

Figure 5:
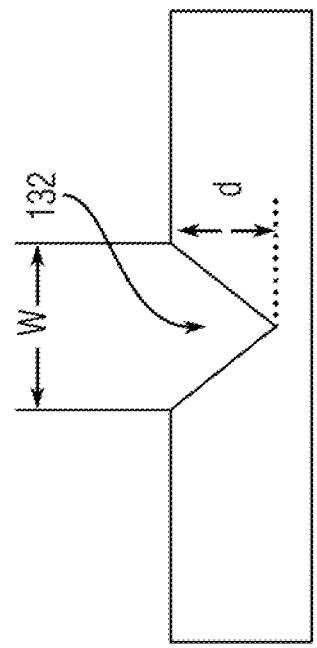
FIG. 5 is a top view of a scratched sample with conductive tape according to an exemplary embodiment of the present invention.
Figure 6:
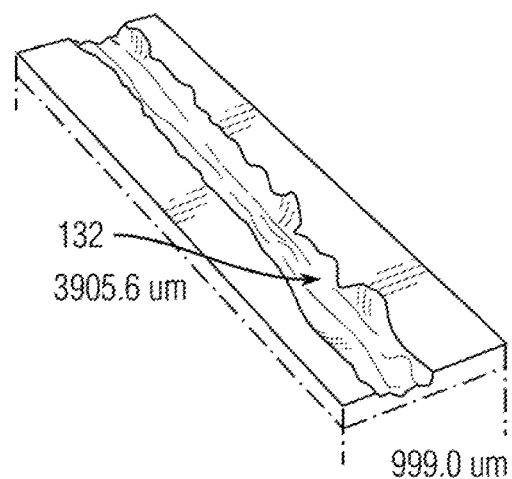
FIG. 6 is a three-dimensional magnified profilometer image of a scratched sample obtained using the scratch tool according to the present invention.

The arrangement of the pin within the scratch tool and the controlled manner in which the sample is moved relative to the pin are designed to produce a scratch of a well-defined width, depth and shape. FIG. 5 shows a schematic cross-section of an exemplary scratch through the repassivation film on a sample. As shown the scratch has a v-shaped profile that corresponding to the shape of the tip of the scratch pin. In some implementations, the width of the scratch preferably ranges from about 20 µm to about 35 µm and the depth of the scratch ranges from about 25 µm to about 40 µm. While the cross-section view shown in FIG. 5 is schematically illustrated, the width and depth of the scratches obtained using the scratch tool of the present invention is generally uniform. For example, FIG. 6 shows a three-dimensional magnified profilometer image of a scratched sample obtained using the scratch tool according to the present invention. The profilometer image shows a certain amount of non-uniformity near the top edge of the scratch, while the depth near the center of the scratch and the width as measured near the at or near top of the scratch is quite uniform as indicated by the color scale.

Figure 7:
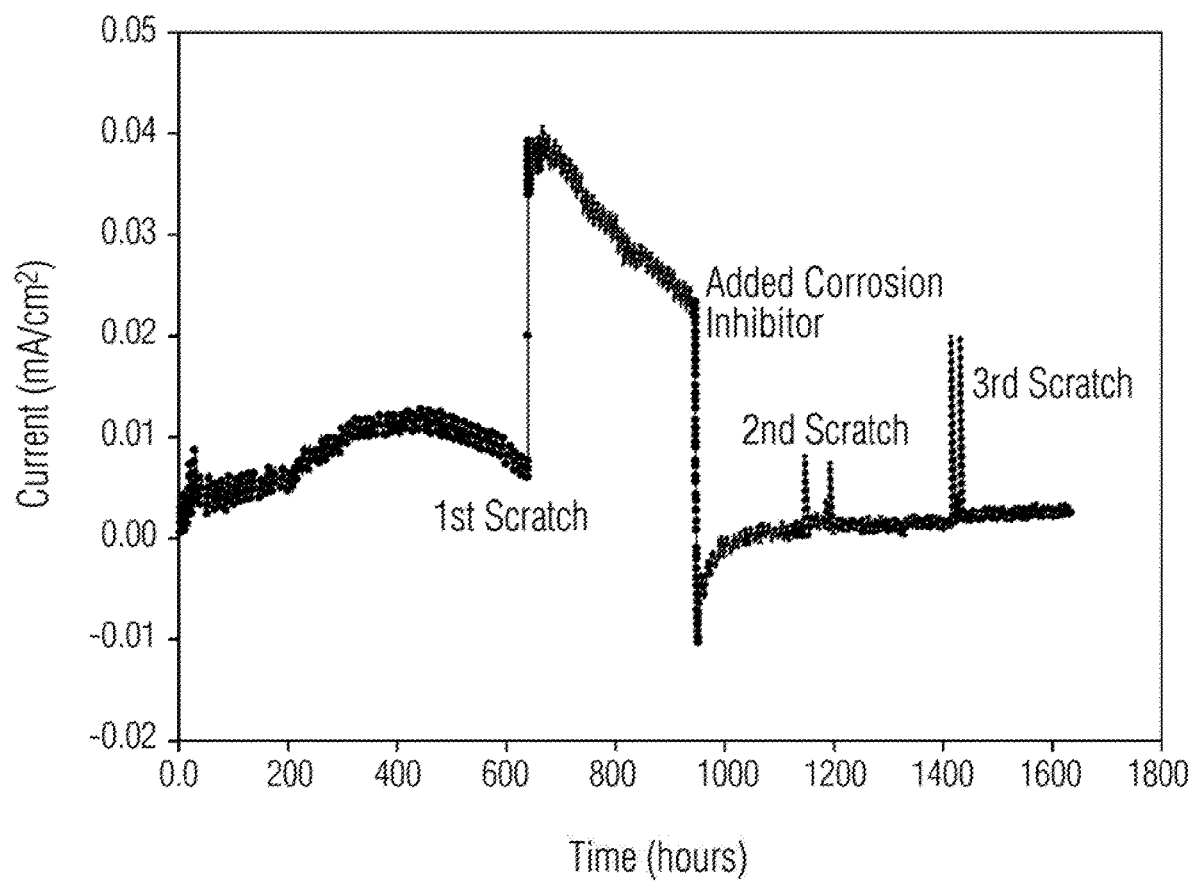
FIG. 7 is a graph of galvanic corrosion current measurement of carbon steel C1018 in field brine with and without corrosion inhibitor at 25° C.

Once scratched and the metal surface is exposed, the mounted sample becomes electrically and chemically active and acts as the small anode of the electrochemical cell. The annular section acts as the corresponding cathode of the cell. A current flow can be measured between scratched electrode (anode) and the internal cathode surface through an ammeter (e.g., a zero resistance ammeter). The current flow is dependent upon the repassivation kinetics of steels and the corrosion inhibitor film-forming tendency at the anode steel sample. In this manner, the corrosion rate data can, in turn, be derived from the galvanic current. FIG. 7 is a graph of galvanic corrosion current measurement of carbon steel C1018 in field brine with and without corrosion inhibitor at 25° C. The graph indicates the dramatic effect of adding the corrosion inhibitor in reducing current. The effect appears to be maintained even after subsequent scratches.

One of the advantages provided by the apparatus and method of the present invention Adapting similar metallurgy of the cathode and anode will serve two purposes namely: unifying a variable and quantifying the electro-potential difference between large formed corrosion film and small bare material "the driving force of localized corrosion" which is extremely high particularly in iron sulfide film e.g. Mackinawite phase. For other passive alloys, this apparatus can be also used to study the Stress Corrosion Cracking (SCC), and repassivation kinetics using cyclic polarization and potentiostatic techniques in simulated oil field sour environments.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A scratch tool apparatus adapted for an electrochemical system including an enclosure having a top cover with an opening for measuring the repassivation kinetics and corrosion inhibitor film persistency of a metallic material under simulated sour oil field conditions comprising:
    a unitary rectangular housing having a central section that extends longitudinally from a first longitudinal end to a second longitudinal end made of an insulating material and having an opening positioned toward the second longitudinal end, the housing including flanges that extend perpendicularly from the central section of the housing at the first longitudinal end, the central section being sized to fit into the opening of the cover of the electrochemical cell while the flanges extend so as not to fit through the opening and provide a seat for a top of the scratch tool to sit on top of the cover of the electrochemical cell;
    a sample holder positioned within the opening of the housing adapted to hold a sample composed of the metallic material while the sample is exposed to a surrounding environment;
    a shaft coupled to the sample holder which extends from the first longitudinal end of the housing to the sample holder that is manually operable to move the sample holder longitudinally; and
    a pin having a tip positioned proximal to a surface of the sample;
    wherein the shaft can be moved to cause motion of the sample relative to the pin tip to create a scratch on the surface of the sample, and the scratch tool can be coupled to an electrochemical cell in such manner that the sample can be scratched while the sample is immersed in an electrolyte with a sour field conditions.

2. The scratch tool apparatus of claim 1, further comprising a conductive wire coupled at a first end to the sample, wherein the second end of the conductive wire can be coupled to an electrical power source to enable the sample to act as the anode of an electrochemical cell.

3. The scratch tool apparatus of claim 1, further comprising an adjustment knob coupled to the pin, wherein the adjustment knob is configured to control a positioning and pressure exerted by the pin on the sample surface.

4. The scratch tool apparatus of claim 1, wherein the pin is made from high speed steel (HSS).

5. The scratch tool apparatus of claim 1, wherein the sample holder is configured to receive samples in the shape of a disc.

6. The scratch tool apparatus of claim 1, wherein the flanges positioned at the first longitudinal end are opposite from the opening positioned toward the second longitudinal end, wherein the flanges are adapted to enable the scratch tool to be seated on an external surface of the enclosure while the second longitudinal end is immersed in the electrolyte.

* * * * *